H. M. SHEDD.
MOTOR DRIVEN FAN.
APPLICATION FILED JULY 27, 1908.
930,622.
Patented Aug. 10, 1909.
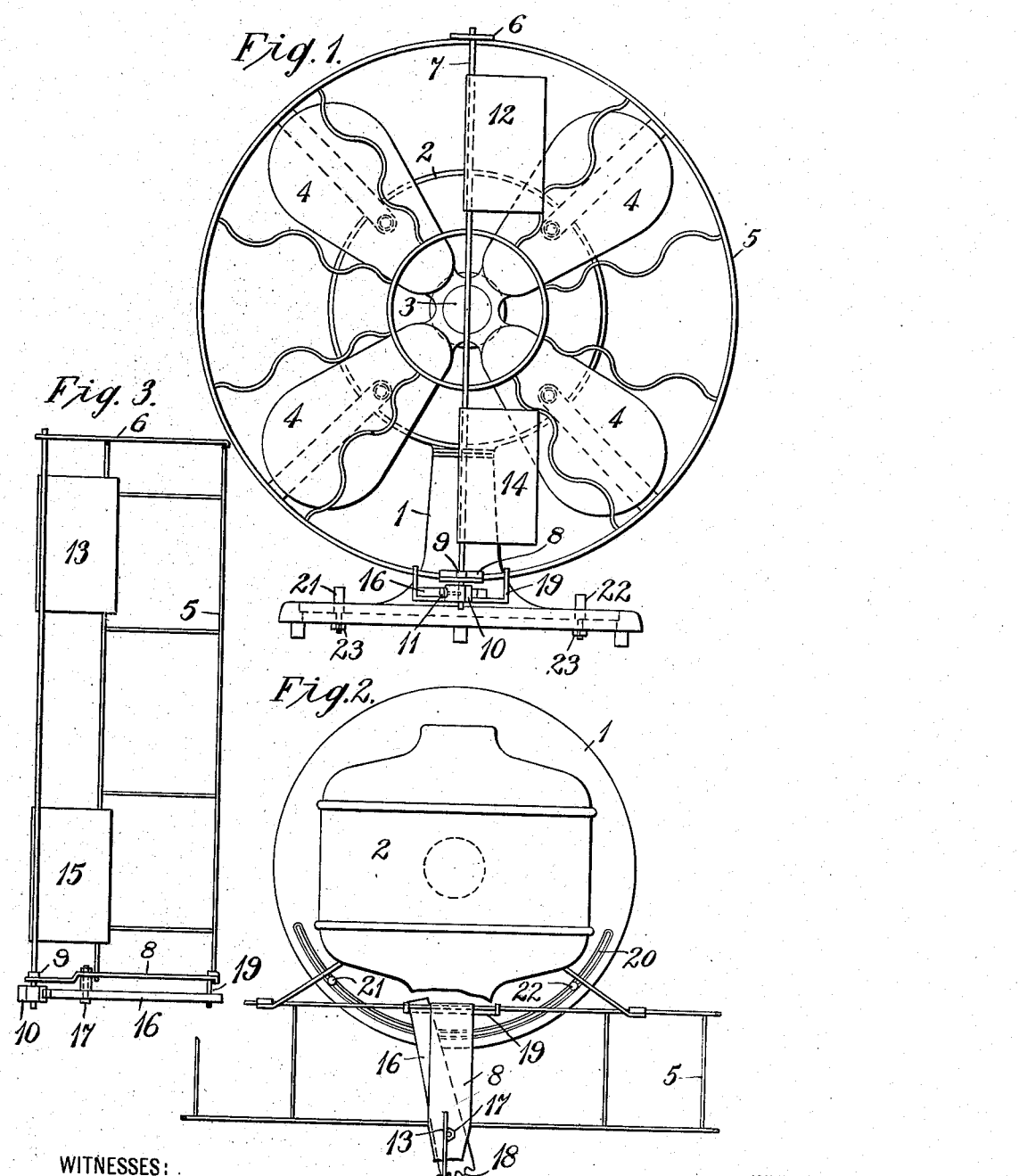
WITNESSES:
INVENTOR
Harry M. Shedd
BY
ATTORNEY

UNITED STATES PATENT OFFICE.

HARRY M. SHEDD, OF ROSELLE, NEW JERSEY, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

MOTOR-DRIVEN FAN.

No. 930,622.     Specification of Letters Patent.     Patented Aug. 10, 1909.

Application filed July 27, 1908. Serial No. 445,667.

*To all whom it may concern:*

Be it known that I, HARRY M. SHEDD, a citizen of the United States, residing at Roselle, in the county of Union and State of New Jersey, have invented a new and useful Motor-Driven Fan, of which the following is a specification.

My invention relates to motor-driven rotary fans, and it has for its objects, first: to provide a fan of the character above specified, which, instead of producing an air current in but one direction continuously, will automatically alter its position periodically in such manner that the air currents produced by it will pass in an ever-changing direction about the place wherein it is in operation, second: to provide a fan of the above specified character which will have a rotative movement in a horizontal or other plane, through an arc of any desired length, third: to provide a fan of the above specified character in which are combined lightness, simplicity and economy in cost of production, and effectiveness in operation. I attain these objects by the mechanism illustrated in the accompanying drawing, in which—

Figure 1 is a front elevation of a fan embodying my invention. Fig. 2 is a plan view of the fan shown in Fig. 1, parts being broken away. Fig. 3 is a side elevation of a portion of the mechanism shown in Figs. 1 and 2.

Pivotally mounted upon a base 1 is a motor 2, the shaft 3 of which is provided with fan blades 4. Attached to the motor is a guard or cage 5 which incloses the fan blades in order to protect them from contact with external objects. Projecting forwardly from the top of the fan guard or cage 5 is a bar 6, the outer end of which is provided with a bearing for one end of a shaft 7. The bottom of the guard or cage is provided with a similar forwardly projecting bar 8 having a bearing in its outer end for the lower end of the shaft 7. The shaft 7 is provided with a collar 9 which rests upon the bar 8, and below the bar it is provided with a gear segment 10 which is clamped to it by a set-screw 11. The shaft 7 is disposed in its bearings substantially parallel to the pivotal axis of the motor 2 and is provided with a plurality of vanes which are disposed substantially at right angles to each other. As here shown, two blades 12 and 13 having the above specified right-angle relation are rigidly mounted upon the shaft 7 above the motor shaft 3 and a like pair of vanes 14 and 15 are rigidly mounted upon the shaft 7 below the motor shaft, but I do not intend to limit my invention as regards the number of vanes or their location upon the shaft 7.

A lever 16 is located below the bar 8 and is pivoted thereto at 17 in such manner that the gear teeth 18, with which its outer end is provided, will engage the teeth of the gear segment 10. A combined guide and limit stop 19 for the inner end of the lever 16 is suspended from the guard or cage 5, the sides of which are so spaced apart that the rotative movements of the shaft 7 will be limited to an arc of ninety degrees.

In order to limit the arc through which the fan shall turn upon its pivotal support, I provide the base 1 with a circumferentially curved slot 20 to receive the shanks of pins or posts 21 and 22 which are clamped in position by means of nuts 23 and which may be adjusted to any extent desired, within the limits of the slot.

In case oscillation of the fan through an arc of 360° is desired, a single pin or post will obviously be sufficient, and, in case continuous rotation of the fan is desired both pins or posts will be removed.

The operation is as follows: Assuming that the parts occupy the positions indicated in Figs. 1 and 2 of the drawings, the currents of air from the fan blades will be obstructed by the vanes 12 and 14 to a sufficient degree to turn the fan in a clockwise direction until the inner end of the lever 16 comes into engagement with the post 21 which will force the said lever end to the other side of the guide 19. As the teeth 18 on the outer end of the lever engage the teeth of the gear segment 10, the shaft 7 will be turned through an angle of ninety degrees and the vanes 13 and 15 be thereby moved into a plane which is substantially perpendicular to the plane of the shaft 7 and the pivotal axis of the fan. The vanes 13 and 15 will then obstruct portions of the air currents from the fan blades to such a degree as to cause the fan to turn upon its pivotal axis in a contra-clockwise direction until the inner end of the lever 16 engages the post 22 when the vanes will be thrown to their original positions by the means above described and the fan will again turn in a clockwise direction. The length of the arc of oscillation may obviously be varied by adjusting the posts 21 and 22 in the slot 20.

Means for turning the current-obstructing vanes which differ from the specific devices here shown and described may be employed, if desired, and I therefore do not limit the scope of my invention in this regard.

I claim as my invention:

1. The combination with a pivotally mounted, motor-driven fan, of a shaft centrally disposed in front of the fan and substantially parallel to its pivotal axis, means dependent upon oscillations of the fan for imparting limited rotative movements to said shaft, and a plurality of obstructing vanes disposed at right angles to each other upon said shaft.

2. The combination with a pivotally mounted, motor-driven fan, of a shaft centrally disposed in front of the fan and substantially parallel to its pivotal axis and susceptible of ninety degree rotative movements, a plurality of obstructing vanes disposed at right angles to each other and attached to said shaft, means dependent upon oscillations of the fan for rotatively actuating said shaft and thereby presenting broad vane surfaces to the currents of air from the fan alternately at opposite sides of the shaft.

3. The combination with a pivotally mounted, motor-driven fan, of a shaft centrally disposed in front of the fan and substantially parallel to its pivotal axis, means dependent upon oscillations of the fan for imparting limited rotative movements to said shaft, a plurality of vanes attached to the shaft and disposed in planes at right angles to each other.

4. The combination with a pivotally mounted, motor-driven fan, of a shaft centrally disposed in front of the fan and substantially parallel to its pivotal axis, obstructing vanes attached to the respective ends of said shaft and disposed at right angles to each other, a gear segment attached to said shaft, a pivotally mounted lever having gear teeth upon one end to engage said gear segment, and posts supported on the stationary base of the fan in the path of movement of said lever as it swings with the fan around the base.

5. The combination with a pivotally mounted, motor-driven fan, of a shaft centrally disposed in front of the fan and substantially parallel to its pivotal axis and susceptible of limited rotative movements, means dependent upon oscillations of the fan to produce said rotative movements, and obstructing vanes disposed at right angles to each other and attached to the respective ends of said shaft.

6. The combination with a pivotally mounted, motor-driven fan, of a shaft centrally disposed in front of the fan and substantially parallel to its pivotal axis, means dependent upon oscillations of the fan for imparting a limited rotative movement to said shaft and obstructing vanes disposed at right angles to each other and affixed to the respective ends of said shaft.

7. The combination with a pivotally mounted, motor-driven fan, of a shaft centrally disposed in front of the fan and substantially parallel to its pivotal axis, two vanes affixed to one end of said shaft, substantially at right angles to each other, two correspondingly disposed vanes affixed to the other end of said shaft, a gear segment affixed to the lower end of said shaft, a pivotally mounted lever having gear teeth to mesh with the gear segment on said shaft, and a post or posts projecting from the stationary base of the fan into the path of movement of the pivotally mounted lever as it swings around the base with the fan.

8. The combination with a pivotally mounted, motor-driven fan, of a plurality of vanes disposed in two planes substantially at right angles to each other and pivotally mounted in front of the pivotal axis of the fan, and means dependent upon the oscillations of said fan for presenting the broad surfaces of the vanes to the currents of air from said fan alternately at opposite sides of the pivotal support.

In witness whereof I hereunto subscribe my name at Roselle, N. J., this 10th day of July, A. D. 1908.

HARRY M. SHEDD.

Witnesses:
 CHARLES C. WAITE,
 W. V. WAID.